3,228,886
METHOD OF PREPARING COMPACTIBLE THORIUM OXIDE-PLUTONIUM OXIDE PARTICLES
Milton H. Lloyd, Oak Ridge, Tenn., assignor to the United States of America as represented by the United States Atomic Energy Commission
No Drawing. Filed July 2, 1963, Ser. No. 292,793
5 Claims. (Cl. 252—301.1)

My invention relates to fuel and fertile materials for nuclear reactors and more particularly to a method of preparing plutonium-containing thorium oxide particles. The invention described herein was made in the course of, or under, a contract with the U.S. Atomic Energy Commission.

Mixed oxides consisting of thorium oxide and a small amount of fissionable uranium or plutonium oxide are useful as combined fertile and fuel material for nuclear reactors. The combined oxides may be employed in fuel elements for breeder or converter nuclear reactors wherein fissionable material is produced as well as consumed. Applications of this type require preparation of the oxide in a form amenable to fuel element fabrication by simple methods under remote control, owing to the radiation hazard presented by thorium daughter activity in the thorium fuel cycle.

One method which has proven advantageous for this purpose is fabrication by means of vibratory compaction. In this method dense oxide particles within selected size fractions are compacted to a suitable density, e.g., about 89 to 91 percent of theoretical, in tubular metal containers by merely introducing the sized particles and subjecting the loaded tube to vibration. In order to obtain high density in the compacted mass, dense oxide particles falling within three size fractions are required. For example, effective compaction is obtained by employing a mixture comprising about 60 weight percent large particles (+16, −10 mesh, U.S. Sieve Series), 15 weight percent medium-sized particles (+100, −70 mesh) and 25 weight percent small particles (−200 mesh). In addition to the specified particle size, a high density, that is, 95 to 99 percent of theoretical, and sufficient strength to allow vibration without breakage are required, along with uniform distribution of the fissionable oxide throughout the thorium oxide. The most crucial problem involved in vibratory compaction is preparation of the large particles 1 to 2 millimeters in diameter with the required properties.

Thorium oxide particles suitable for vibratory compaction have been prepared by forming a thorium oxide sol in an aqueous nitrate-containing system, evaporating the sol under controlled conditions to produce dried gel fragments and firing the gel fragments. This method has also been applied to thorium-uranium oxide by incorporating up to 10 atom percent uranium in the sol in the form of a dispersible uranium oxide, precipitated ammonium diuranate or as an aqueous solution of uranyl nitrate, the commonly available uranium-nitrate compound which is stable under ordinary conditions. The corresponding procedure, however, is ineffective when applied to the preparation of thorium-plutonium oxide particles. Complete dispersion of plutonium oxides or ammonium-precipitated plutonium requires an amount of nitrate in excess of the maximum allowable for a stable thorium oxide sol so that the sol is destroyed before the plutonium is uniformly distributed throughout the system. The same effect is produced when a solution of plutonium is added in its commonly available and most stable state in a nitrate system, namely, as plutonium (IV) nitrate, $Pu(NO_3)_4$. It is desired to provide a means of incorporating plutonium values in the thorium oxide sol in this process without destroying the sol.

It is, therefore, an object of my invention to provide a method of preparing thorium oxide-plutonium oxide particles suitable for fabrication by vibratory compaction.

Another object is to provide a method of preparing said particles with a high density and a particle size of about 1 to 2 millimeters.

Another object is to provide a method of preparing said particles wherein the plutonium oxide is uniformly distributed throughout the thorium oxide.

Another object is to provide a method of incorporating plutonium values in a thorium oxide sol without destroying the sol.

Other objects and advantages of my invention will be apparent from the following detailed description and claims appended hereto.

In accordance with my invention plutonium-containing thorium oxide particles are prepared by adding plutonyl nitrate, $PuO_2(NO_3)_2$, to an aqueous suspension of dispersible thorium oxide at a plutonium proportion up to about 5 mole percent of the total metal values therein, digesting the resulting suspension until a sol is formed, evaporating the sol to produce dried gel fragments and firing the gel fragments. Relatively large, high-density particles suitable for fabrication by vibratory compaction are obtained. This process is easily controlled and may be carried out in simple equipment so that remote-control handling is facilitated. The plutonium is uniformly distributed throughout the product particles, owing to adsorption on the surface of the colloidal thorium oxide.

I have found that plutonium values may be incorporated in a thorium oxide sol by first converting the commonly available, stable tetravalent plutonium nitrate, $Pu(NO_3)_4$, to hexavalent plutonyl nitrate, $PuO_2(NO_3)_2$. The latter species is unique among plutonium compounds in its capacity for dispersion in the sol without rendering the sol unstable.

The starting thorium oxide in the method of my invention must be sufficiently dispersible to form a sol upon being digested in an aqueous nitrate system. It is preferred to use thorium oxide prepared by contacting thorium nitrate with superheated steam at a maximum temperature of about 475° C. This material is in the form of crystalline aggregates which degrade to single crystallites of about 50 to 100 angstroms means diameter upon being digested in an agitated nitrate system. Other methods which may be employed for preparation of the dispersible thorium oxide include the following: denitration of thorium nitrate in air at a maximum temperature of 475° C., precipitation of hydrous thorium oxide from thorium nitrate solution with ammonium hydroxide and calcination of thorium oxalate at a temperature of 650° C. to 1000° C. Formation of a sol and adsorption of plutonium are described below primarily with reference to steam-denitrated thorium oxide. Material prepared by the other methods may require prolonged digestion for sol formation, and the maximum amount of plutonyl nitrate allowable will be varied slightly since the method of preparation affects the surface characteristics, and the nitrate interacts with the thoria surface in the sol-forming reaction.

Dispersible thorium oxide is suspended in an aqueous system at any concentration up to about 5 molar, with 1 to 2 molar being preferred. Plutonyl nitrate is then added, preferably in aqueous solution, to provide a plutonium concentration up to about 5 mole percent of the total metal values in the mixture. At higher proportions the dispersed thorium oxide sol fails to form a stable sol, owing to the presence of excess nitrate from the plutonyl nitrate. This method is particularly applicable to the preparation of oxides containing about 1 to 4 mole percent plutonium with respect to total metal. The nitrate contained in plutonyl nitrate is sufficient for dispersion of the thorium oxide at plutonium proportions above about 2 mole percent. If lower proportions of plutonium are desired in the product, additional nitrate may be supplied in the form of nitric acid. A plutonyl nitrate solution suitable for addition to the thorium oxide may be prepared from plutonium (IV) nitrate, $Pu(NO_3)_4$, by distilling the latter material in nitric acid solution and dissolving the residue. In order to enhance formation of the sol and adsorption of plutonium, the pH of the system may be adjusted after addition of the plutonyl nitrate. A pH of about 2.5 to 4.0 may be employed, and 3.5 to 4.0 is preferred. The pH after addition of plutonyl nitrate is normally about 2.5, and adjustment to the preferred value may be made by addition of ammonium hydroxide.

The plutonyl nitrate-containing thorium oxide suspension is then digested under agitation to form a sol. Although the digestion temperature is not critical, it is preferred to heat the system to obtain a faster reaction. Temperaures from about 40° C. up to the boiling point may be employed, and about 90° C. is preferred. Digestion for a period of about 2 to 4 hours is normally required at this temperature. Adsorption of the plutonium in this step is indicated by the change from the characteristic brown color of plutonyl ion to light green in the sol. Any remaining undispersed solids may be separated from the sol by filtration or decantation.

The plutonium-containing thorium oxide sol is then evaporated under controlled conditions to produce dried gel fragments. The critical feature in evaporating the sol is to keep the temperature below 100° C. until the bulk of the volatile nitrate and water is removed and the material has progressed through a pasty stage and cracked apart to produce gel fragments. It is preferred to maintain the sol at a temperature of about 80° C. to 90° C. until all except about 3 to 7 percent of the volatile nitrate and water have been removed from the resulting gel. A period of 4 to 24 hours is suitable under typical conditions.

The dried gel fragments are then fired to produce dense oxide particles. A firing temperature of at least 1100° C. is required for a high density, and maximum density is obtained at about 1150° C. The rate of temperature increase during firing is not critical, and the gel fragments may be heated at rates as high as 300° C. per hour without breakage. To ensure maximum densification the temperature may be held at 1150° C. for at least one hour.

The resulting particles exhibit high density, typically 97 percent of theoretical, and a hard, glass-like structure well suited to vibratory compaction. The particle size of over 90 weight percent of the product is normally larger than 16 mesh (1.19 millimeters) and about 75 percent is larger than 10 mesh (2 millimeters). The oversize material may be reduced to the desired size by conventional crushing or grinding. While the product particles are strong enough to resist breakage in vibratory compaction, they are nevertheless amenable to size reduction by conventional techniques.

My invention is further illustrated by the following specific example.

*Example*

An aqueous solution containing 10.7 grams plutonium as plutonyl nitrate, $PuO_2(NO_3)_2$, was prepared by boiling a solution of tetravalent plutonium nitrate, $Pu(NO_3)_4$, with a 4 molar nitric acid solution in a distilling flask and dissolving the residue in 200 milliliters of water. The resulting solution was added to an aqueous slurry consisting of 267 grams of thorium oxide in 500 milliliters of water, the thorium oxide having been prepared by contacting thorium nitrate with steam at a maximum temperature of 475° C. The plutonium content of the resulting mixture was 4.25 mole percent, and the pH was 2.5. The mixture was digested for 4 hours at 90° C. to produce a sol. Five grams of thorium oxide which remained undispersed was separated by decantation. The sol was then evaporated at 80° C. to produce dried gel fragments. The gel fragments were then fired in air at 1200° C. The resulting oxide product was in the form of particles largely 2 to 6 millimeters in diameter. The density of the particles was determined to be 97 percent of theoretical. Visual inspection revealed the particles to have a hard, glossy structure characteristic of compactible material. From measurement of the plutonium content of the particles it was determined that the plutonium distribution was virtually uniform, with a slightly higher content in the finer particles. A 68.5-gram sample of the particles was then compacted to a density of 76 percent in a metal tube by means of the following procedure: The particles were ground with a mortar and pestle to produce a size distribution of 60 weight percent, +16, −10 mesh; 15 weight percent, +100, −70 mesh; and the balance, −200 mesh. The sized particles were then poured in a tube 6.5 millimeters in diameter and vibrated by means of hand tamping.

The above example is merely illustrative and is not to be understood as limiting the scope of my invention, which is limited only as indicated by the appended claims.

Having thus described my invention, I claim:

1. The method of preparing plutonium-containing thorium oxide particles which comprises adding plutonyl nitrate to an aqueous suspension of dispersible thorium oxide at a plutonium proportion up to about 5 mole percent of the total metal, adjusting the resulting mixture to a pH of 2.5 to 4.0, digesting the resulting mixture until a sol is formed, evaporting said sol at a temperature below 100° C. whereby dried gel fragments are formed and firing the resulting gel fragments at a temperature of at least 1100° C.

2. The method of claim 1 wherein the pH of said resulting mixture is adjusted to a value of 3.5 to 4.0.

3. The method of claim 1 wherein said dispersible thorium oxide is prepared by contacting thorium nitrate with steam at a temperature not exceeding 475° C.

4. The method of claim 1 wherein said sol is evaporated at a temperature of about 80° C. to 90° C.

5. The method of claim 1 wherein plutonyl nitrate is added to said suspension at a plutonium proportion of about 1 to 4 mole percent of the total metal values therein.

References Cited by the Examiner

UNITED STATES PATENTS

| | | | |
|---|---|---|---|
| 3,035,895 | 5/1962 | McCorkle | 23—14.5 |
| 3,168,601 | 2/1965 | St. Pierre | 23—14.5 X |

OTHER REFERENCES

AEC Document, ORNL–3225, June 19, 1962, pages 8–24.

REUBEN EPSTEIN, *Primary Examiner.*

BENJAMIN R. PADGETT, *Examiner.*

A. G. BOWEN, *Assistant Examiner.*